US006929001B2

(12) United States Patent
Yoon

(10) Patent No.: US 6,929,001 B2
(45) Date of Patent: Aug. 16, 2005

(54) ROTATING BARBECUE GRILL

(76) Inventor: Cheol Jung Yoon, 15802 Cawood Pl., La Mirada, CA (US) 90638

( * ) Notice: Subject to any disclaimer, the term of this patent is extended or adjusted under 35 U.S.C. 154(b) by 0 days.

(21) Appl. No.: 10/688,812

(22) Filed: Oct. 20, 2003

(65) Prior Publication Data

US 2005/0081839 A1    Apr. 21, 2005

(51) Int. Cl.[7] ............................................. A47J 37/07
(52) U.S. Cl. .............................. 126/25 AA; 126/25 R; 126/41 A
(58) Field of Search ................................ 126/9 R, 9 A, 126/25 R, 25 A, 25 AA, 29, 30, 41 B, 152 B, 126/154, 41 A; 99/443 R, 449, 450, 340; D7/408, 409

(56) References Cited

U.S. PATENT DOCUMENTS

| | | | | |
|---|---|---|---|---|
| 3,033,190 A | * | 5/1962 | Atkinson | 126/25 AA |
| 3,298,301 A | * | 1/1967 | Lowndes | 99/340 |
| 3,512,515 A | * | 5/1970 | McGee | 126/25 A |
| 3,657,996 A | * | 4/1972 | Thompson | 99/443 R |
| D229,277 S | * | 11/1973 | Chan | D7/337 |
| 4,129,111 A | * | 12/1978 | Lehtovaara | 126/25 AA |
| 4,274,341 A | | 6/1981 | Ozaltay | 110/229 |
| 4,370,920 A | | 2/1983 | Henriques et al. | 99/339 |
| 4,724,753 A | * | 2/1988 | Neyman et al. | 99/339 |
| 5,359,988 A | * | 11/1994 | Hait | 126/25 R |
| 5,619,821 A | | 4/1997 | St. George et al. | 49/57 |
| 5,782,224 A | | 7/1998 | Rabell | 126/25 |
| 5,787,873 A | * | 8/1998 | Whitehouse | 126/25 R |
| 6,029,565 A | | 2/2000 | Plymale | 99/397 |
| 6,484,625 B2 | * | 11/2002 | Waltman | 99/421 HH |
| 6,564,793 B2 | | 5/2003 | DeClue | 126/25 |

* cited by examiner

Primary Examiner—Carl D. Price
(74) Attorney, Agent, or Firm—Park & Sutton LLP; John K. Park

(57) ABSTRACT

A barbecue grill comprises a gridiron disk, a shaft extending from the gridiron disk so that the shaft becomes substantially perpendicular to the gridiron disk, a bowl having a channel where the shaft is detachably received through the channel, and a motor attached to the bowl to generate rotation of the shaft.

22 Claims, 4 Drawing Sheets

ROTATING BARBECUE GRILL

BACKGROUND OF THE INVENTION

This invention relates to a barbecue grill. More particularly, the present invention relates to a barbecue grill having a rotating gridiron disk to realize an even broiling and a minimal food burning with less consumption of charcoal or gas.

Conventional charcoal grills on the market are provided with an iron bowl to hold charcoals and a grill plate grated with wires. The grill plate is hooked above the charcoals and supported by an upper portion of the iron bowl. In order to evenly barbecue on the grill plate, the ham or equivalents need to shift from center to edge or edge to center, or to flip over when required. In order to use the typical outdoor grill, food is placed on a fixed grill surface, and a source of heat is provided.

U.S. Pat. No. 6,564,793 discloses rotation of a heat source or a firebox using a shaft connected to the firebox. The firebox rotation is urged by a motor and serves to decrease unexpected flaring from the heat source. A problem in the above disclosure is an instability and lack of comfortability in the barbecue session. Maintaining the firebox in a stationary alignment and rotating gridiron or grill surface will overcome the disadvantages. Further, grill surface rotation will expand its application to charcoal grill in addition to the gas grill.

A demand is to evenly barbecue ham or sausage on the grill plate and to minimize excessive burning of the barbecue. Another demand is to introduce a charcoal grill that consumes less amount of charcoals or gas.

SUMMARY OF THE INVENTION

The present invention is contrived to overcome the conventional disadvantages. Accordingly, an object of the invention is to provide a barbecue grill that realizes an even broiling and subsequent optimal barbecue. Another object is to minimize excessive burning of food on a wire grid plate. A further object is to minimize consumption of charcoal or gas.

To achieve these and other objects, the barbecue grill according to the present invention comprises a gridiron disk, a shaft extending from the gridiron disk so that the shaft becomes substantially perpendicular to the gridiron disk, a bowl having a channel where the shaft is detachably received through the channel, and a motor attached to the bowl to generate rotation of the shaft.

For a better performance, the barbecue grill includes a tray having a center opening where the tray is provided between the gridiron disk and the channel so that the shaft passes through the center opening. The gridiron disk is formed of a plurality of linear wires, or a combination of linear and circular wires. The shaft is detachably attached to a center of the gridiron disk, and the channel is formed through a bottom center of the bowl.

In an embodiment, the motor is formed underneath the bowl, and the tray is partitioned to a first half and a second half so that the first half has a plurality of pores.

Here, the second half of the tray may be devoid of pores, and the first half of the tray is substantially embossed. A lower end of the shaft is detachably fit in a top portion of the motor.

In a preferred version, a heat insulator is provided between the bowl and the motor so that the heat insulator is formed in a staple format to include a base and a vertical support raised from each side of the base where the vertical support serves to allow an air gap between the bowl and the motor.

Advantages of the present invention are numerous in that: (1) the rotation of the gridiron disk during barbecue session minimizes excessive partial burning of food, thereby maximizing customer satisfaction; (2) the half-porous tray allows charcoal on the porous half to compensate for the non-porous half that carries no charcoal thereon in terms of heat generation, relative to the rotating gridiron disk, thereby substantially saving fuel consumption; and (3) the combination of the gridiron disk rotation and the half-porous tray format enables an even broiling and subsequent optimal barbecue, thereby realizing product reliability.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE PREFERRED EMBODIMENTS

Figure 1:
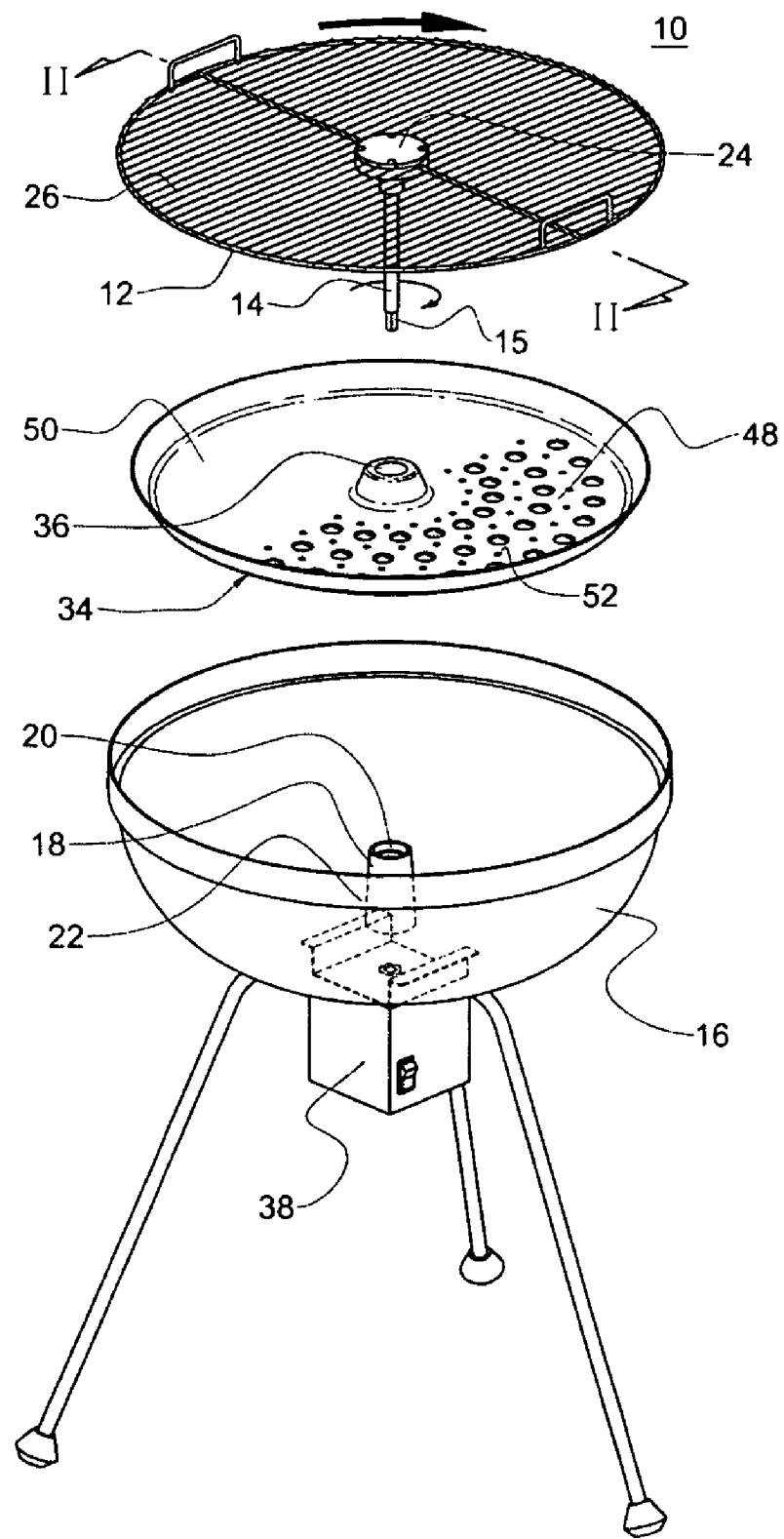
FIG. 1 is an exploded view showing a barbecue grill according to the present invention.
Figure 2:
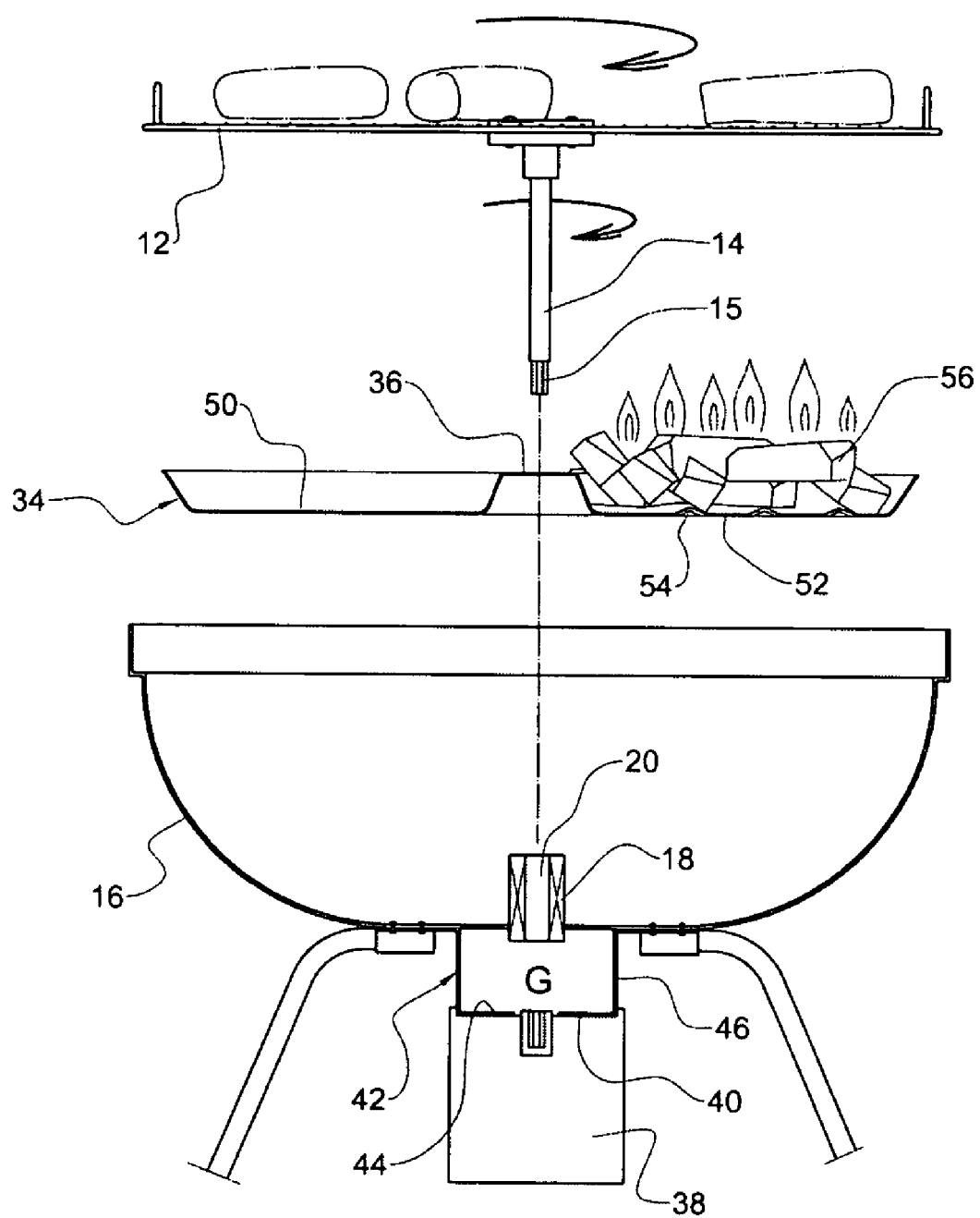
FIG. 2 is a cross-sectional view taken along line II—II in FIG. 1.
Figure 3:
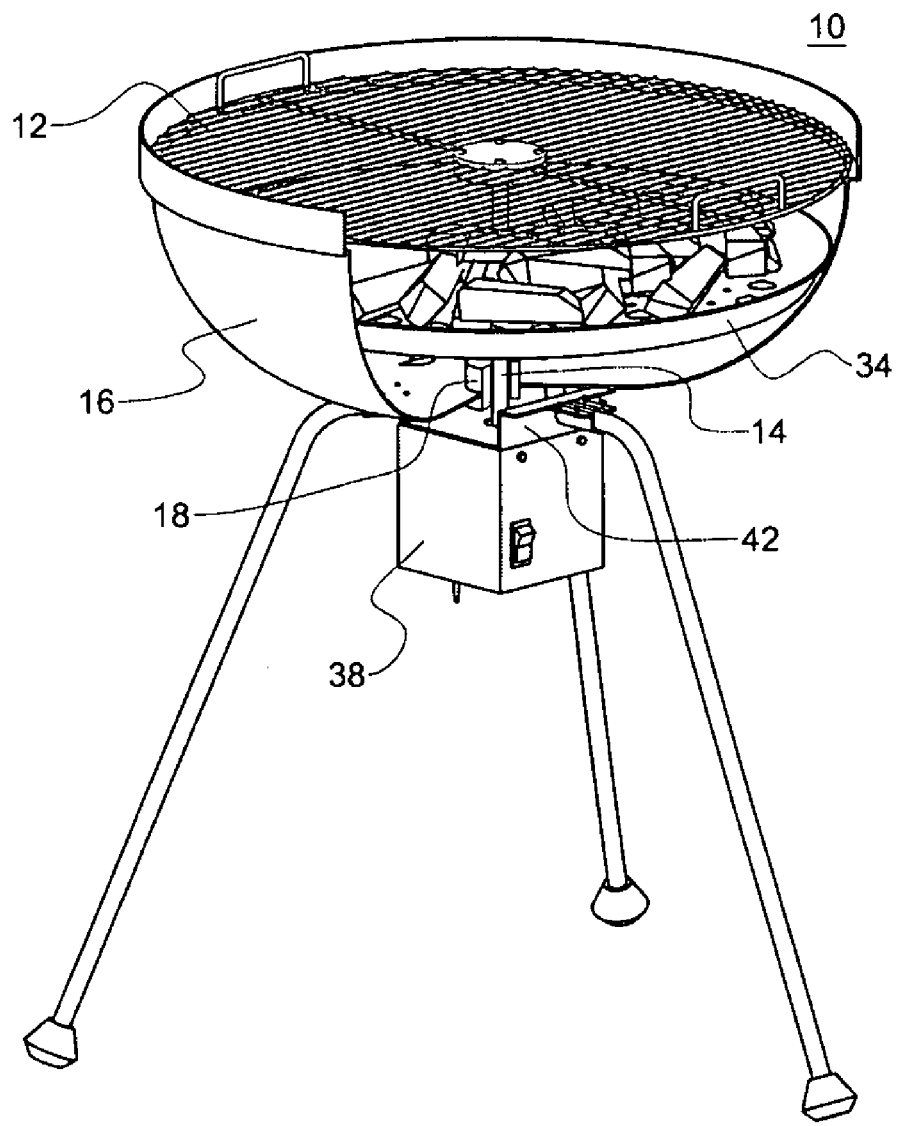
FIG. 3 is a partially sectioned view showing mechanism of the present invention.

FIG. 1 shows an assembly view of a barbecue grill 10 according to the present invention in a vertically exploded alignment, FIG. 2 shows a mechanism of the grill operation in relation with FIG. 1, and FIG. 3 shows a partially sectioned view of the barbecue grill 10. As shown therein, the barbecue grill 10 includes a gridiron disk 12, and a shaft 14. The shaft 14 extends from the gridiron disk 12 so that the shaft 14 becomes substantially perpendicular to the gridiron disk 12. In a preferred version, the shaft 14 is either fixed to the gridiron disk 12 or detachably attached to the gridiron disk 12. Preferably, the shaft 14 is attached to a center portion 24 of the gridiron disk.

Figure 4:
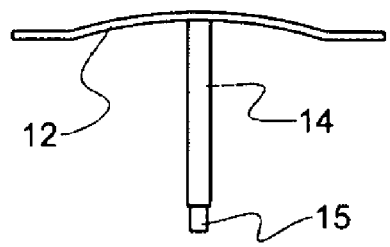
FIGS. 4 and 5 are side views each showing a gridiron disk with a shaft according to the present invention.
Figure 5:
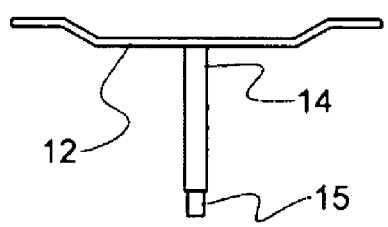
Figure 6:
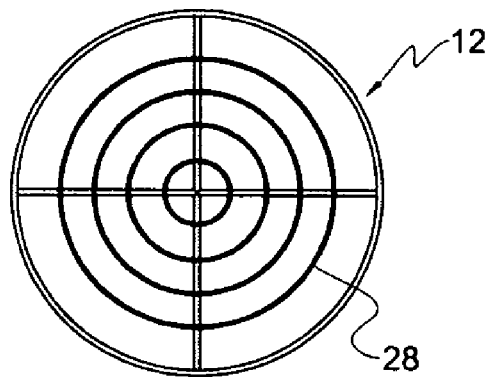
FIGS. 6 and 7 are top view each showing grid construction of the gridiron disk of this invention.
Figure 7:
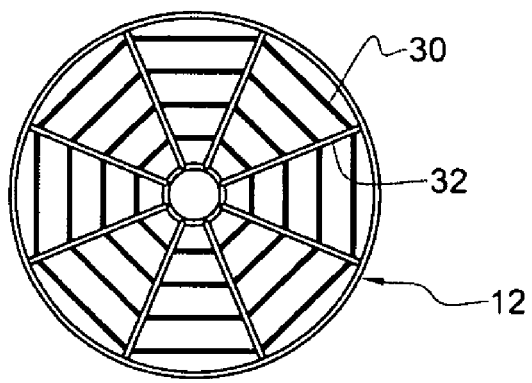

As further shown in FIGS. 4 and 5, the gridiron disk 12 may be either radially embossed or marginally stepped to provide convenience in food arrangement and further control of food broiling on the gridiron disk 12. Also, FIGS. 6 and 7 show variations of wire alignment for the gridiron disk 12. That is, the gridiron disk 12 may be formed of a plurality of linear wires 26, a combination alignment of a plurality of linear wires 26 and circular wires 28, or a plurality of short and straight wires 30 interlinking radial base wires 32.

For a better performance, a bowl 16 having a channel 18 is provided such that the shaft 14 is detachably received through the channel 18. The channel 18 is formed in a cylindrical shape to have a vertical hole 20 so that the shaft 14 releasably passes through the hole 20 of the channel 18. The channel 18 is formed through a bottom center 22 of the gridiron disk 12.

Between the gridiron disk 12 and the bowl 16 is selectively provided a tray 34 to contain charcoals therein. The tray 34 has a center opening 36 so that the shaft 14 releasably passes through the center opening 36. Here, when the tray 34 is placed in the bowl, the channel 18 becomes aligned with the center opening 36 of the tray 34. It is preferred that the channel 18 is spaced from the center opening 36. Also, the tray 34 may serve as a firebox to controllably release gas as a source of fuel.

In this construction, a motor 38 attached to the bowl 16 serves to generate rotation of the shaft 14 and subsequent rotation of the gridiron disk 12. Here, the motor 38 is formed underneath the bowl 16. To facilitate assembly and disassembly of the barbecue grill 10, a lower end 15 of the shaft 14 is detachably fit in a top portion 40 of the motor 38, and preferably the lower end 15 of the shaft 14 is substantially angled in a polyhedron format.

Meanwhile, between the bottom center 22 of the bowl 16 and the motor 38 is formed a heat insulator 42 for stability and safety purposes. The heat insulator 42 is preferably formed in a staple format to include a base 44 and a vertical support 46 raised from each side of the base 44. Here, the vertical support 46 serves to allow an air gap G between the bowl 16 and the motor 38.

In the best mode, the tray 34 is partitioned to a first half 48 and a second half 50 where the first half 48 has a plurality of pores 52, and the second half 50 of the tray 34 is devoid of pores 52. The first half 48 of the tray 34 is substantially embossed. So the embossing 54 serves to prevent the charcoals 56 placed on the first half 48 from moving or being displaced.

Consequently, when the motor 38 is turned on, the gridiron disk 12 makes a clockwise or counterclockwise rotation whereas the tray 34 remains stationary. So the subsequent rotation of the shaft 14 carried on by the tray 34 and the channel 18 of the bowl 16 and generates the rotation of the gridiron disk 12.

As discussed above, an advantage of the present invention is that the rotation of the gridiron disk 12 during barbecue session minimizes excessive partial burning of food, thereby maximizing customer satisfaction. Further, the half-porous tray 34 allows charcoals 56 on the porous half 48 to compensate for the non-porous half 50 that carries no charcoal thereon in terms of heat generation, relative to the rotating gridiron disk 12, thereby substantially saving fuel consumption. In addition, the combination of the gridiron disk rotation and the half-porous tray format enables an even broiling and subsequent optimal barbecue, thereby realizing product reliability.

Although the invention has been described in considerable detail, other versions are possible by converting the aforementioned construction. Therefore, the scope of the invention shall not be limited by the specification specified above.

What is claimed is:

1. A barbecue grill:
  a) a gridiron disk;
  b) a shaft extending from the gridiron disk so that the shaft becomes substantially perpendicular to the gridiron disk;
  c) a bowl having a channel, wherein the shaft is detachably received through the channel;
  d) a tray having a center opening, wherein the tray is provided between the gridiron disk and the channel so that the shaft passes through the center opening, wherein the tray is partitioned to a first half and a second half, wherein the first half has a plurality of pores; and
  a) a motor attached to the bowl to generate rotation of the shaft.

2. The barbecue grill of claim 1 wherein the gridiron disk is formed of a plurality of linear wires.

3. The barbecue grill of claim 1 wherein the gridiron disk is formed of a plurality of linear and circular wires.

4. The barbecue grill of claim 1 wherein the shaft is detachably attached to a center of the gridiron disk.

5. The barbecue grill of claim 1 wherein the channel is formed through a bottom center of the bowl.

6. The barbecue grill of claim 1 wherein the motor is formed underneath the bowl.

7. The barbecue grill of claim 1 wherein the second half of the tray is devoid of pores.

8. The barbecue grill of claim 1 wherein a lower end of the shaft is detachably fit in a top portion of the motor.

9. The barbecue grill of claim 8 wherein the lower end of the shaft is substantially angled in a polyhedron format.

10. The barbecue grill of claim 1 further comprising a heat insulator between the bowl and the motor.

11. The barbecue grill of claim 10 wherein the heat insulator is formed in a staple format to include a base and a vertical support raised from each side of the base, wherein the vertical support serves to allow an air gap between the bowl and the motor.

12. The barbecue grill of claim 1 wherein when the motor is turned on the gridiron disk makes a clockwise rotation whereas the tray remains stationary.

13. The barbecue grill of claim 1 wherein when the motor is turned on the gridiron disk makes a counterclockwise rotation whereas the tray remains stationary.

14. The barbecue grill of claim 1 wherein the gridiron disk is radially embossed.

15. The barbecue grill of claim 1 wherein the gridiron disk is marginally stepped.

16. A barbecue grill:
  a) a gridiron disk;
  b) a shaft extending from the gridiron disk so that the shaft becomes substantially perpendicular to the gridiron disk;
  c) a bowl having a channel, wherein the shaft is detachably received through the channel;
  d) a tray having a center opening, wherein the tray is provided between the gridiron disk and the channel so that the shaft passes through the center opening, wherein the tray is partitioned to a first half and a second half, wherein the first half has a plurality of pores, wherein the first half of the tray is substantially embossed; and
  b) a motor attached to the bowl to generate rotation of the shaft.

17. The barbecue grill of claim 16 wherein the second half of the tray is devoid of pores.

18. The barbecue grill of claim 16 further comprising a heat insulator between the bowl and the motor.

19. The barbecue grill of claim 18 wherein the heat insulator is formed in a staple format to include a base and a vertical support raised from each side of the base, wherein the vertical support serves to allow an air gap between the bowl and the motor.

20. The barbecue grill of claim 16 wherein when the motor is turned on the gridiron disk makes a clockwise rotation whereas the tray remains stationary.

21. The barbecue grill of claim 16 wherein when the motor is turned on the gridiron disk makes a counterclockwise rotation whereas the tray remains stationary.

22. The barbecue grill of claim 16 wherein the gridiron disk is radially embossed.

* * * * *